United States Patent [19]

Howell

[11] 4,078,864
[45] Mar. 14, 1978

[54] METHOD AND APPARATUS FOR VIEWING AND MEASURING DAMAGE IN AN INACCESSIBLE AREA

[75] Inventor: Robert E. Howell, West Palm Beach, Fla.

[73] Assignee: United Technologies Corporation, Hartford, Conn.

[21] Appl. No.: 703,402

[22] Filed: Jul. 8, 1976

[51] Int. Cl.² ............................................. G01B 11/02
[52] U.S. Cl. ..................................... 356/171; 350/10; 356/3; 356/241
[58] Field of Search ....................... 356/3, 16, 21, 127, 356/171, 241; 350/10

[56] References Cited

U.S. PATENT DOCUMENTS

| | | | |
|---|---|---|---|
| 1,250,717 | 12/1917 | Tubbs | 356/3 |
| 1,318,155 | 10/1919 | Kingsley et al. | 356/3 |
| 3,297,022 | 1/1967 | Wallace | 356/241 |
| 3,329,059 | 7/1967 | McCormac | 356/241 |
| 3,715,161 | 2/1973 | Koeber | 356/3 |
| 3,846,008 | 11/1974 | Sobajima et al. | 350/10 |

OTHER PUBLICATIONS

Lenox Instrument Company, Inc., "Chamberscope Models 5854 and 5995" Product Bulletin 180, Pat. Off. Date 17 Apr., 1972.

*Primary Examiner*—John K. Corbin
*Assistant Examiner*—R. A. Rosenberger
*Attorney, Agent, or Firm*—Robert C. Walker

[57] ABSTRACT

An optical viewing tube having an eyepiece at one end and a viewing prism at an optical tip at the other end is provided with an optical system therebetween which will provide a focus for an object being viewed. A distance indicating disk or device on said tube is movable by a focusing mechanism to indicate the distance from the optical tip of the viewing tube to a viewed object. A camera is provided to be attached to the viewing tube to take a picture of the viewed object, and an eyepiece with a properly marked reticle is placed on the photograph taken, to indicate proper distances between spaced points on the object as seen in the photographs. The viewing tube is calibrated along its length so that tube penetration can be accurately known and a retention adapter is used with the tube to rigidly fix it in place. The retention adapter includes a compass rose which indicates the position of the viewing prism. An alignment adapter can also be used to insure proper alignment of the tube with a housing to which it is being connected. A modification of the tube has a focus numeral indicating device and an eyepiece containing a measuring device, with this modification the proper distance between spaced points on an object is obtained by obtaining a focus numeral from the indicating device and after obtaining units of distance between the spaced points from a measuring device, a divisional value for a specific reference numeral indicating unit size is multiplied by the number of units obtained from the measuring device to get the actual distance.

6 Claims, 8 Drawing Figures

METHOD AND APPARATUS FOR VIEWING AND MEASURING DAMAGE IN AN INACCESSIBLE AREA

The Government of the United States has rights in this invention pursuant to Contract No. F 33657-70-C-0600 awarded by the Department of the Air Force.

BACKGROUND OF THE INVENTION

This invention relates to devices for measuring the actual dimension of an object viewed at the forward end of an optical viewing tube. Three patents relating to this type of device are U.S. Pat. Nos. 3,595,220; 3,730,632 and 3,817,635.

SUMMARY OF THE INVENTION

In accordance with the present invention, an optical viewing tube is provided to optically or photographically measure an area which is in a generally inaccessible area.

It is an object of this invention to provide an optical viewing tube with a distance indicating device which will indicate the distance of the object from the optical tip of the viewing tube, while the optical tube is held rigid with reference to said viewed object, with the exact position of the viewing tube being shown by a penetration scale and a compass rose.

It is a further object of this invention to provide a method of measuring the actual dimension on an object viewed from the optical tip of the optical viewing tube—the method involves the steps of: (1) fixing a viewing tube in position to view a desired object; (2) when the object is viewed, it is placed in precise focus and a picture is taken of the object and (3) a glass reticle in a viewer is placed over the picture having a scale which indicated a previous marked unit of length for the focused distance indicated.

It is a further object of this invention to provide an optical viewing tube having an eyepiece with a measuring device having a micrometer controlled cursor and a variable numeral indicating device connected to the tube focusing means. A chart or data disk contains divisional values for each number on the indicating device, each value corresponding to a given unit of length at that focused distance. The moving cursor counts the number of micrometer units and this number is multiplied by the divisional value which will give the actual length of the measured surface on the object.

BRIEF DESCRIPTION OF THE DRAWING

FIG. 4 is a sectional view taken through the compressor section of the engine showing a borescope retention adapter bolted in place with the objective end of the borescope positioned adjacent blades on a rotor disk.

FIG. 5 is an enlarged view of the objective end of the borescope showing the viewing surface of the objective prism and showing the end of a fiber optic cable.

DESCRIPTION OF THE PREFERRED EMBODIMENT

Figure 1:
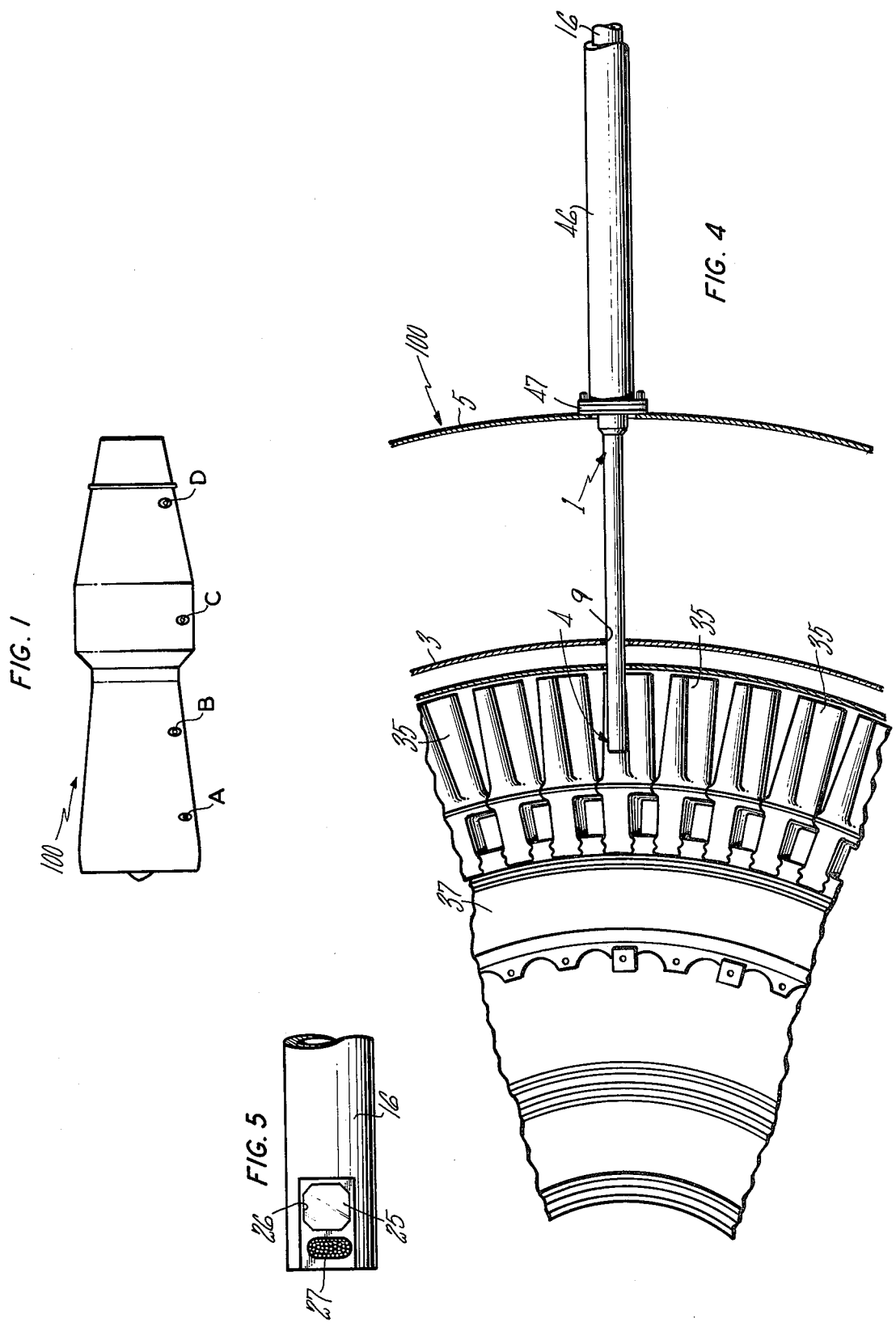
FIG. 1 is a side elevational view of a jet engine showing the location of ports for inserting a borescope.

FIG. 1 shows a jet engine 100 having a conventional compressor section, burner section, turbine section and exhaust section. To provide access to the interior of the engine, opening ports A, B, C and D are provided having cover plates. Each port is located at a place where internal inspection is desired at various intervals. When an inspection is desired or necessary, a cover can be removed and a borescope 1, inserted to view a particular area. In FIG. 1, two ports A and B are shown in the compressor section, one port C in the burner section, and one port D in the turbine section. The use of the borescope with the engine will be hereinafter described.

Figure 2:
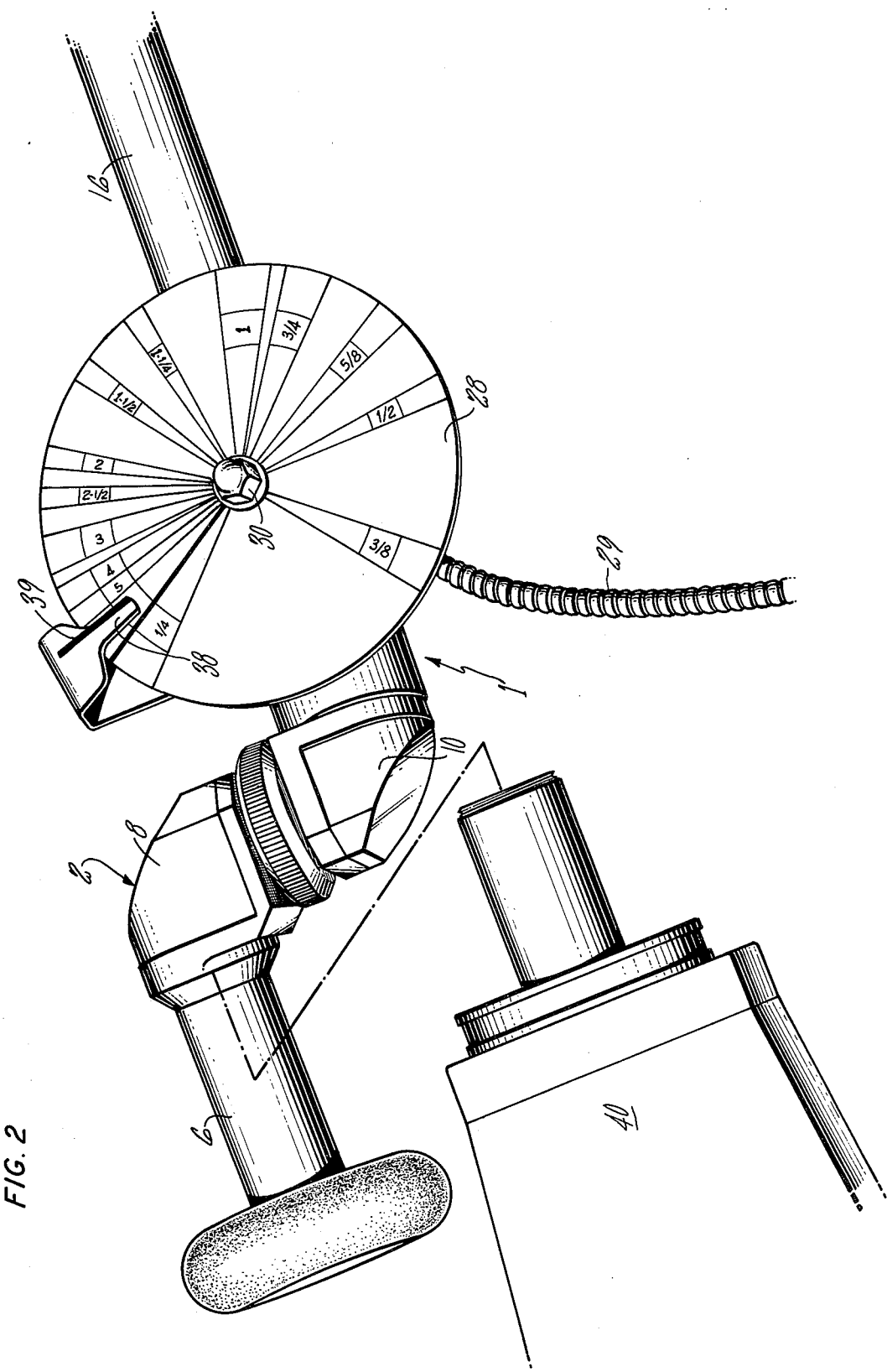
FIG. 2 is a perspective view of the viewing end of a modified borescope having an eyepiece and distance indicating disk with a camera being shown for alternate use in place of the eyepiece.
Figure 3:
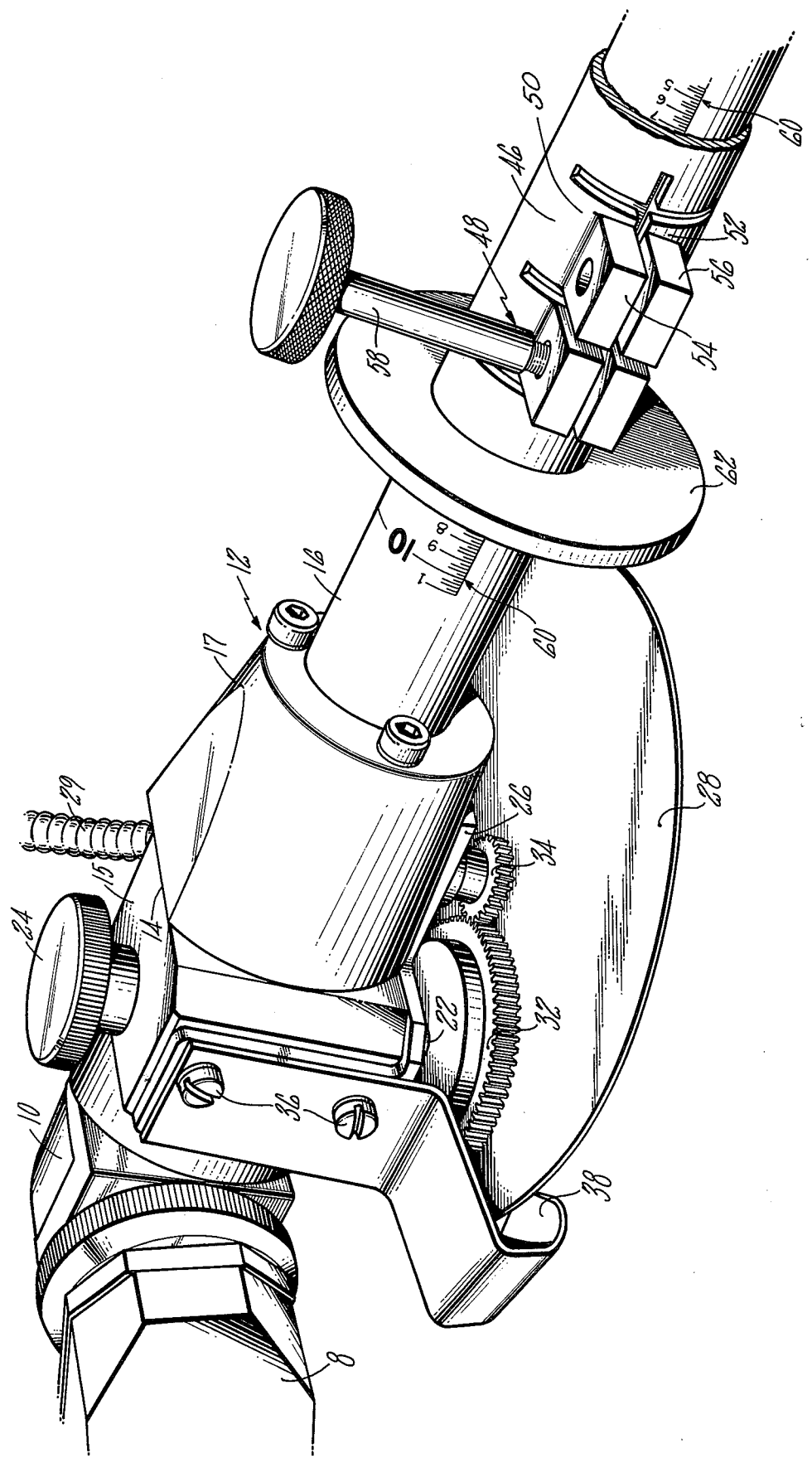
FIG. 3 is a perspective view of a borescope showing the rear of the distance indicating disk and the free end of a retention adapter.

FIGS. 2 and 4 show a borescope 1 of the type having a viewing end 2 and an objective end 4. The viewing end 2 comprises a focusable ocular eyepiece 6 for individual eye focusing with two right angle prisms 8 and 10 for ease of viewing. The prism 10 is connected to a borescope housing 12 comprising an enlarged section 14 and tubular section 16. The free end of the tubular section 16 contains the objective end 4. The enlarged section 14 and tubular section 16 contains a movable tube (not shown, an axially movable tube for focusing is shown in U.S. Pat. No. 3,359,849) therein having an optical system which when moved axially will provide a focus for an object being viewed from the objective end 4. Further fixed optics are contained in the tubular section 16 including a right angle objective prism through which an object is viewed. The objective prism has an exposed surface 25 which is aligned with an opening 26 in the side of the end 4 of the tubular section 16.

Adjacent the surface 25 is the end 27 of a fiber optic cable 29 which extends through the tubular section to provide light in front of the exposed objective prism surface 25. Fiber optic cables for this purpose are shown in U.S. Pats. Nos. 3,595,220; 3,730,632; and 3,817,635.

The enlarged section 14 comprises a box-like portion 15, with a connector 19 for prism 10, and a tapered portion 17. The movable tube is guided for axial movement therein and has a rack member thereon. A shaft 22 is mounted for rotation in portion 15 and extends to the exterior thereof on each side and has a gear mounted thereon which engages the rack member (not shown). An adjusting knob 24 is connected to one end of the extending shaft 22 for moving said movable tube between its forward and rearward limits of focusing. A short shaft extends from a base plate 26 for receiving a distance indicating disk 28. A nut 30 holds the disk on the shaft. The disk 28 is connected to the other end of the extending shaft 22 by reduction gearing comprising gears 32 and 34. In a construction built, a reduction of approximately 5:1 was used. Base plate 26 is bolted to portion 15 by bolts 36 and can be adjusted to achieve the proper engagement between gears 32 and 34. A pointer 38 is also connected to the portion 15 by bolts 36. A locking device is located between the connector 19 and prism 10. While the locking device provides for locking the prism 10 at every 15° of rotation, other types of locking means can be used. A lever 21 is used to manually lock and unlock the prism 10 from the connector 19.

The distance indicating disk 28 is marked to indicate distances from the exposed surface 25 of the prism corresponding to a particular focus position of the movable tube by knob 24. This is done by fixing the borescope in position and making the perpendicular distance from the objective surface 25, to a surface having a marked known unit of measure thereon, a predetermined value, focusing the borescope on the marked unit of measure and placing an indication on the indicating disk 28 of the predetermined value of distance opposite an indicating line 39 on the pointer 38.

This procedure is done for the range of distances to be encountered. In a construction made a marked known unit of 0.1 of an inch was used, and the predetermined distances used were ¼, ⅜, ½, ⅝, ¾, 1, 1¼, 1½, 2, 2½, 3, 4, 5 and 6. As the borescope was focused at each distance, that distance was marked o the indicating disk 28 opposite the indicating line 39 on pointer 38.

Each time the borescope was focused on one of the 14 predetermined distances, a picture was taken by a camera 40 connected to the right angle prism 8. Each picture had the marked known unit of 0.1 of an inch divided into 20 divisions, each indicating a length of 0.005 of an inch.

Each photographed marked known unit of 0.1 of an inch, divided into 20 divisions, was reproduced, in order, as a scale on a glass reticle 49 and labeled its proper related distance. As can be seen this glass reticle when placed back on a specific photograph taken would indicate the precise marked known unit of 0.1 of an inch, with 20 divisions. This reticle 49 is mounted in an enclosure 31 with a magnifying eyepiece 33 for ease of reading.

While the above reticle was made for a perpendicular view, angled views can be provided for.

To actually inspect jet engine blades 35, for example, on a rotor disk 37, (1) a borescope retention adapter 46 is fixed to a desired borescope opening in an engine casing 5. When necessary, an engine adapter 47 is used to obtain the proper alignment of the borescope 1 within the engine. Where two casings 3 and 5 are encountered, this insures that the borescope properly enters the opening 9 in the inner casing. (2) A borescope 1 is placed in the borescope retention adapter 46 and positioned to view a desired area. To maintain the borescope fixedly in position it is locked in place by a locking device 48. A locking device 48 comprises a pair of locking ears or sections 50 and 52 cut out of the retention adapter which have upstanding flanges 54 and 56 on the ends thereof, respectively. A bolt 58 draws the flanges 54 and 56 together for squeezing the ears 50 and 52 down on the borescope. A second pair of ears and flanges are provided to use the bolt 58 from the opposite side. (3) To know actual penetration of the borescope and the direction of sighting, a linear scale 60 is placed along the length of the tubular section 16, said scale having an axial base line which if extended would intersect the center of the opening 26. A compass rose 62 is located at the free end of the borescope retention adapter to indicate the angular position of the borescope in the adapter. The base line is used for alignment with the compass degree markings. It can be seen that linear scale 60 and compass rose 62 will permit reexamination at a specific location. (4) Operator rotates the rotor disk 37 containing the blades 35 so that they pass by the exposed surface 25 of the objective prism at the objective end 4 of the borescope. (5) When a nick, crack or other damage is seen, the borescope focusing is rechecked to insure an accurate distance reading from the distance indicating disk 28, the ocular eyepiece is removed and the camera 40 put in place and a picture taken. (6) The glass reticle with magnifying eyepiece is placed on the picture and the proper scale for the distance now indicated on the distance indicating disk 28 is used to measure the damage.

Figure 6:
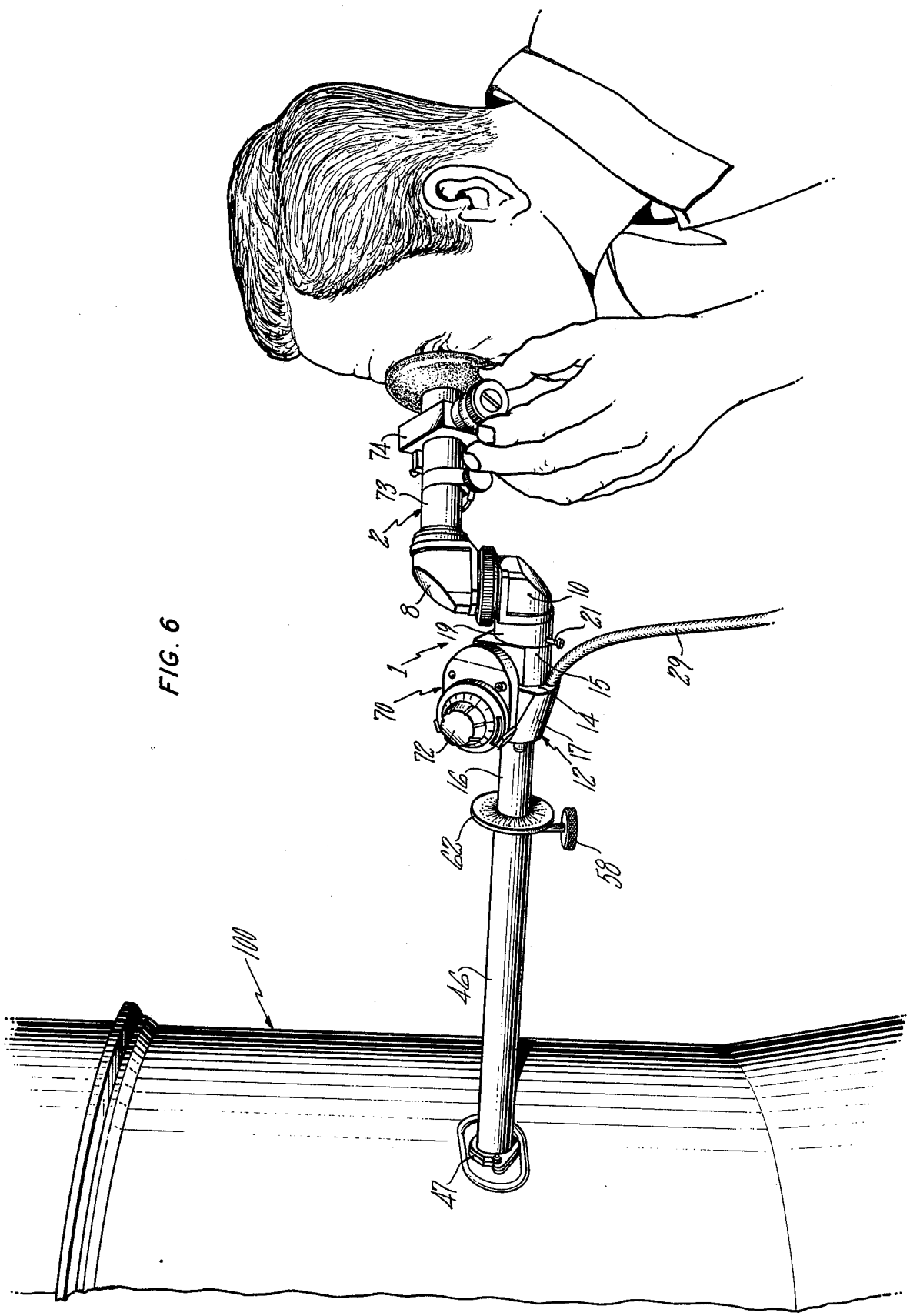
FIG. 6 is a perspective view of another modification of a borescope fixedly located in a retention adapter with an inspector looking through an eyepiece having a measuring device with a micrometer controlled cursor.

FIG. 6 shows a modification of the borescope of FIGS. 2–5. In this modification an infinitely variable numeral indicating device 70 is substituted for the distance indicating disk 28, reduction gearing 32 and 34, base plate 26 and pointer 38. The adjusting knob 24 is also removed and that end of the shaft 22 capped. The device 70 is a self-contained unit wherein the other end of shaft 22 can be inserted therein so that when the adjusting knob 72 thereon is rotated from one end of its movement to the other, indicating the movement of the tube for focusing, a number can be read therefrom at any position indicating that position on the scale of numbers used. In a construction built the device 70 displayed a numeral of 425 at a movable tube position at the end of minimum desired focus distance and a numeral of 622 at the end of maximum desired focus distance. The desired minimum distance for focusing was ¼ inch and the desired maximum distance was 6 inch. It is to be understood that other distances can be used for other constructions. It can be seen that when the borescope is used that as it is focused by the knob 72 a reference numeral of between 425 and 622 can be read therefrom.

Also in this modification the ocular eyepiece 6 is replaced by another compatible eyepiece 73 containing a measuring device 74. The measuring device 74 provides a micrometer controlled cursor to count the number of given micrometer units covered by the moving cursor.

The viewed number on the device 70 indicates a known length of the micrometer uniti at the focused distance from the exposed surface 25 of the objective prism at the objective end 4. To obtain the actual length of the viewed length in focus the reference numerals of the device 70 are given a divisional value which is one part of an actual known length at that focus.

These divisional values are attained by placing the borescope in a holding device and securing it. The borescope is aimed at a known unit of measure, at a known distance and focused. The cursor of the micrometer is moved across the known unit of measure and the number of micrometer divisions is read. To obtain the divisional value for that known focused distance, the number of micrometer divisions is divided into the known unit of measure. This procedure is used to obtain a divisional value for each number on the indicating device 70, in the case set forth above, there would be a divisional value for each number from 425–622. The divisional value for each number from 425–622 can be placed on a chart for reference or a data disk can be used having the numbers of the device 70 placed circumferentially therearound with the corresponding divisional value of each number placed radially outwardly thereof so that an alignment arm pivoted at the center of the disk can be aligned with a specific number of underline the corresponding divisional value.

Now, to measure an unknown length at a focused distance, the indicating device 70 is read and the corresponding divisional value is determined, the cursor is then moved along the unknown length and the number of micrometer units read; the micrometer units are then multiplied by the divisional value to get the actual length.

Further, a television camera can be connected to the measuring device 74 to deliver a video picture to a television monitor and to a video tape recorder, if desired, for a permanent record.

Figure 7:
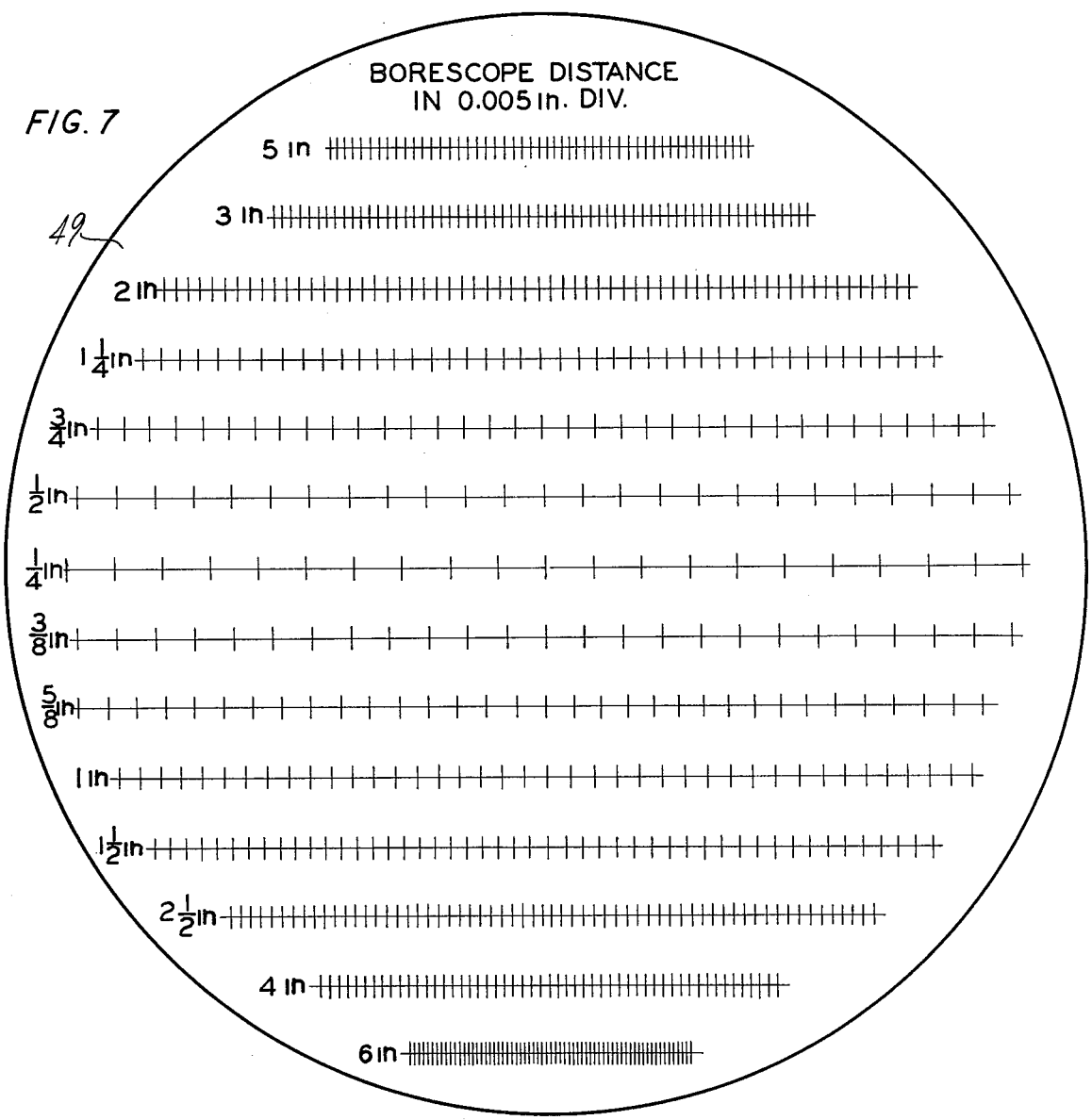
FIG. 7 is an enlarged view of a reticle for use with the borescope of FIGS. 2 and 3.
Figure 8:
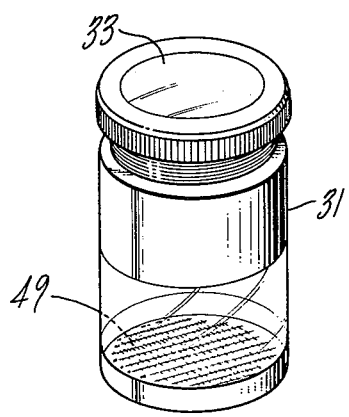
FIG. 8 is a magnifying eyepiece containing a reticle 49.

Another method of using the borescope of FIG. 7 with a camera 40 is set forth below. The eyepiece 73 containing the measuring device 74 can be removed and a camera 40 connected in place thereof for taking a picture of the focused object having damage. The picture of the damage can be measured in a manner similar to the method used before. The indicating device 70 is read. To obtain the actual length of the pictured damage the reference number of the device 70 is given a divisional value which is one part of an actual known length in a picture taken at that focus. To obtain the divisional value for a given focus, and therefore, a given reference numeral on the device 70, a picture is taken at each reference numeral of a known length. A reticle containing a scale having a plurality of equidistant closely spaced markings is constructed having a magnifying viewing lens. The reticle is placed on each of the photographs and the number of spaced markings along the known length is recorded. The number of spaced markings is divided into the known length, this arrives at the divisional value for the camera method.

Now, to measure an unknown length on a picture taken at a focused distance, the indicating device 70 is read and the corresponding new camera divisional value is determined, the reticle is then placed on the picture and the number of spaced markings extending along a crack or nick is determined, then this number is multiplied by the camera divisional value to obtain the actual length of the damage.

I claim:

1. An apparatus for viewing and measuring an object through a small opening within a housing which is generally inaccessible, including an optical viewing tube of fixed length, viewing means having an eyepiece at one end of said optical viewing tube, optical lens at the other objective end of said optical viewing tube for producing an image, a movable optical system located within said tube of fixed length between said viewing means and objective end for transmitting said image for viewing at said eyepiece, means for moving said optical system for focusing the image at said eyepiece, means for viewing divisional units through said viewing means, numeral indicating means connected to said optical viewing tube, said numeral indicating means being movable with said focusing means, said numeral indicating means indicating a number which is related to an actual length represented by a divisional unit of said eyepiece at the distance of the object from the objective end as viewed when the object is in focus, a retention tube positioned around said viewing tube of fixed length, said optical viewing tube of fixed length having a sliding and rotating movement within said retention tube, means for fixing said retention tube to a housing around a small opening, means for locking said optical viewing tube, in a fixed position within said retention tube, said viewing means having a micrometer controlled cursor to count the number of divisional units covered by the cursor as it moves between two predetermined points on said focused object wherein the product of said actual length represented by a divisional unit and said counted number of divisional units provides the actual length between the two predetermined points.

2. A combination as set forth in claim 1 wherein said viewing tube is calibrated along its length so that tube penetration within a housing can be accurately known.

3. A combination as set forth in claim 1 wherein said means for fixing said retention tube being located at one end of said tube, said retention tube includes an annular flange on its opposite end, said annular flange containing a compass rose, said viewing tube having a longitudinal line extending along its length which, if extended, would intersect the center of the optical lens at the objective end wherein said line indicates with said compass rose the angular position of the optical lens.

4. A method for measuring between two predetermined points on an object within a housing with an optical viewing tube having an eyepiece at one end and an optical lens at its objective end which comprises the steps of:
(1) axially moving and rotating the objective end of said viewing tube in a housing to locate a desired viewing area on an object;
(2) fixing said optical viewing tube with relation to the area of an object being viewed at a particular distance;
(3) focusing the area of the object in the optical viewing tube at that particular distance;
(4) optically placing a scale of divisional units over said object;
(5) obtaining a number indicating the actual length represented by a divisional unit at the particular distance of the area of the object from the objective end of the optical viewing tube;
(6) counting the number of divisional units between two predetermined points on the object wherein a product of the actual length represented by a divisional unit and said counted number of divisional units provides the actual length between the two predetermined points on said object.

5. A method as set forth in claim 4 wherein step (5) the number indicating the actual length represented by a divisional unit at the particular distance is obtained by:
(a) placing an object having a larger known length at said particular distance from said optical lens;
(b) placing the object in focus;
(c) moving a micrometer controlled cursor capable of counting said maller divisional units across the object having a larger known length while reading the number of divisional units wherein the number of divisional units is then divided into the larger known length to obtain the actual length of a smaller divisional unit at said particular distance.

6. A method for viewing and measuring the actual distance between two points on an object in an aircraft engine with an optical viewing tube having an optical lens at its objective end which comprises the steps of:
(1) forming an opening in the side of the engine;
(2) mounting said optical viewing tube for axially sliding and rotative movement in said opening in said engine;
(3) moving said optical viewing tube to locate a desired viewing area on an object having the distance between two points to be measured;
(4) fixing said optical viewing tube with relation to the area being viewed at a particular distance;
(5) focusing the area of the object in the optical viewing tube at that particular distance;

(6) optically placing a scale of divisional units over said object;
(7) obtaining the actual length represented by a divisional unit at that particular distance of the area of the object from the objective end of the optical viewing tube;
(8) counting the number of divisional units between the two points on the object where a product of said counted number of divisional units and the actual length represented by a divisional unit provides the actual length between the two points.

* * * * *